United States Patent [19]

Brugerolle et al.

[11] Patent Number: 5,785,740

[45] Date of Patent: Jul. 28, 1998

[54] DEVICE AND PROCESS FOR THE SEPARATION OF GAS BY ADSORPTION

[75] Inventors: Jean-Renaud Brugerolle; Christian Monereau, both of Paris, France

[73] Assignee: L'Air Liquide, Societe Anonyme pour L'Etude et L'Exploitation des Procedes Georges Claude, Paris Cedex, France

[21] Appl. No.: 732,140

[22] Filed: Oct. 16, 1996

Related U.S. Application Data

[63] Continuation-in-part of Ser. No. 552,312, Nov. 8, 1995, Pat. No. 5,679,134.

[30] Foreign Application Priority Data

May 19, 1995 [FR] France .................. 95 05956

[51] Int. Cl.⁶ .................. B01D 53/053
[52] U.S. Cl. .................. 95/102; 95/105; 95/130; 95/138; 96/130; 96/144
[58] Field of Search .................. 95/96–106, 117, 95/130, 138, 139, 126–133; 96/126–133

[56] References Cited

U.S. PATENT DOCUMENTS

| | | | |
|---|---|---|---|
| 3,121,625 | 2/1964 | Broughton | 95/96 |
| 3,740,928 | 6/1973 | Schmid | 96/130 X |
| 4,302,224 | 11/1981 | McCombs et al. | 96/128 X |
| 4,342,573 | 8/1982 | McCombs et al. | 96/128 X |
| 4,378,982 | 4/1983 | McCombs | 96/130 X |
| 4,449,990 | 5/1984 | Tedford, Jr. | 95/102 X |
| 4,534,346 | 8/1985 | Schlaechter | 95/102 X |
| 4,892,566 | 1/1990 | Bansal et al. | 95/98 |
| 4,948,391 | 8/1990 | Noguchi | 95/98 |
| 5,213,593 | 5/1993 | White, Jr. | 95/99 |
| 5,223,004 | 6/1993 | Etéve et al. | 95/98 |
| 5,370,728 | 12/1994 | LaSala et al. | 95/101 |

FOREIGN PATENT DOCUMENTS

| | | |
|---|---|---|
| 0 038 410 | 10/1981 | European Pat. Off. . |
| 0 525 521 | 2/1993 | European Pat. Off. . |
| 2138663 | 1/1973 | France . |
| 2 337 754 | 2/1974 | Germany . |
| 34 05 260 | 8/1985 | Germany . |
| WO 88/05693 | 8/1988 | WIPO . |

*Primary Examiner*—Robert Spitzer
*Attorney, Agent, or Firm*—Young & Thompson

[57] ABSTRACT

A device for separation of gas by adsorption, of the so-called VSA or MPSA type, comprises, between a utilization line (L) and a source (S) of gaseous mixture to be separated, at least one module (M) comprising in series a reversible rotary machine (R), typically a Roots machine, an adsorber (A) and a shut-off valve (V), the rotary machine (R) being alternately actuated, in one direction during a first phase of pressurization and of production and then, in the other direction, during a second phase of depressurization and desorption. Used particularly in the production of small and medium volumes of oxygen in modular installations.

21 Claims, 3 Drawing Sheets

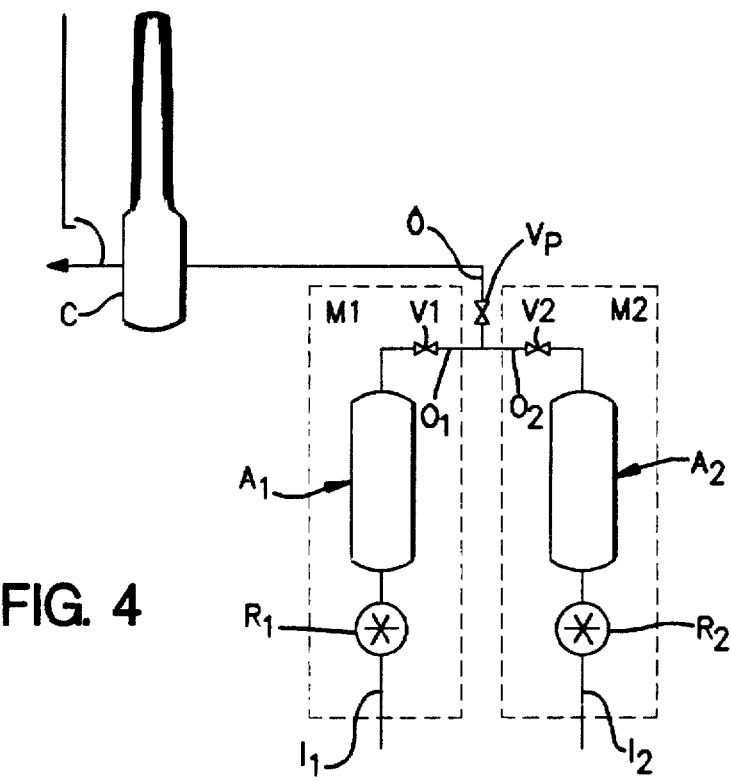
FIG. 4
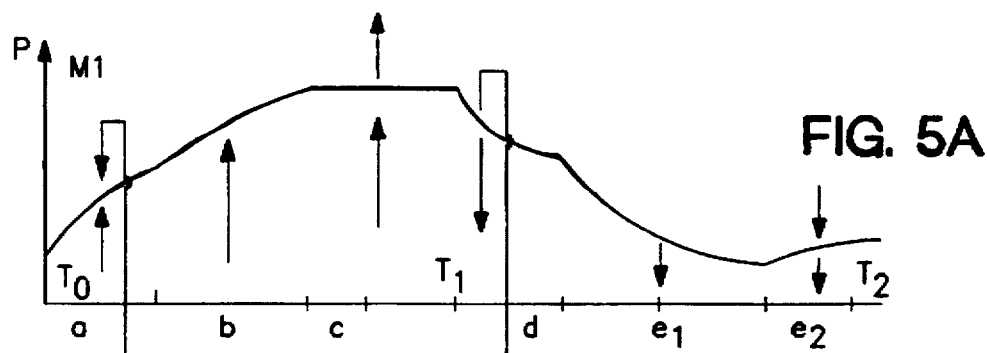
FIG. 5A
FIG. 5B
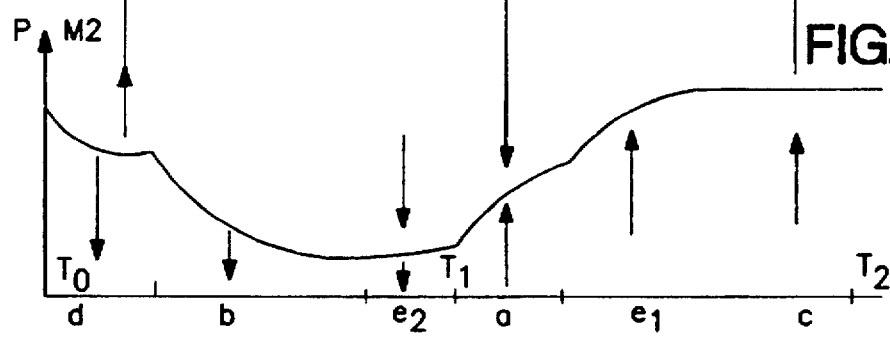
FIG. 5C

DEVICE AND PROCESS FOR THE SEPARATION OF GAS BY ADSORPTION

CROSS-REFERENCE TO RELATED APPLICATIONS

The present application is a continuation-in-part of copending application Ser. No. 08/552,312, filed Nov. 8, 1995, now U.S. Pat. No. 5,679,134.

FIELD OF THE INVENTION

The present invention relates to devices for the separation of gas by adsorption with variable pressure, of the so-called VSA or MPSA type, and more particularly devices of medium or small capacity comprising at least one rotary machine acting on an adsorber as a compressor or a pump.

Background of the Invention

The known devices, as described in U.S. Pat. No. 4,534,346 of 1983, and, more recently, in U.S. Pat. No. 5,370,728 of 1993, comprise a rotary machine having a high pressure side and a low pressure side and actuated in rotation continuously in the same direction and at the same speed, the optimization of the level of the rotary machine being however largely counterbalanced by the use of numerous valves whose number, on the one hand, and adjustment and maintenance of their synchronization, on the other hand, greatly increase the cost of production and use.

SUMMARY OF THE INVENTION

The present invention has for its object to provide an adsorption device permitting simplifying the circuitry and greatly limiting the number of valves and thus permitting the provision of individual adsorption modules having great flexibility of use and permitting particularly their arrangement in a battery of modules in parallel, permitting covering wide ranges of use and conditions of operation.

To do this, according to the invention, the device comprising at least one module includes:

- an inlet conduit continuously communicating with a source of gaseous mixture to be separated;
- an outlet conduit adapted to be connected to at least one storage means for gas impoverished in at least one of the constituents of the gaseous mixture;
- in series, between the inlet conduit and the outlet conduit, a reversible rotary machine and an adsorber; and
- means to actuate sequentially the rotary machine in opposite directions of rotation.

According to other characteristics of the invention:

- a first storage means is continuously connected to a utilization line of the impoverished gas;
- at least one second storage means is connected only to the outlet conduit;
- the device comprises at least two individual modules disposed in parallel between the source of gaseous mixture and the utilization line.

The present invention also has for its object to provide processes for using such devices having a wide range of uses and for the separation of different gases.

According to one aspect of the invention, the rotary machine associated with an adsorber is alternately actuated, during a first phase, or gas supply phase for the adsorber in one direction, then, during a second phase, or extraction phase for gas from the adsorber, in the other direction.

According to a more particular characteristic of the invention, the drive of the machine is interrupted for a predetermined period at the end of each phase.

With a device and a process according to the invention, there is no isolation valve on opposite sides of the rotary machine, and in particular between this latter and the inlet of the adsorber, the reversibility of this rotary machine permitting ensuring alternately and successively a compression of the gaseous mixture to be separated to a high cycle pressure for the adsorption stage and a vacuum pumping to a low pressure cycle for a desorption phase, the reversal taking place in a flexible and economic manner by using to the maximum the self-rotation resulting from the reverse pressure differentials and the forces of inertia acting on the rotary portions of the machine.

BRIEF DESCRIPTION OF THE DRAWINGS

Other characteristics and advantages of the present invention will become apparent from the following description of embodiments given by way of illustration but not in a limiting way, with respect to the accompanying drawings, in which:

FIG. 4 is a schematic view of a device using two modules;

FIGS. 5A–5C are graphs, similar to those of FIGS. 3A and 3B, showing the opening/closing cycles of the valves of the device of FIG. 4;

DETAILED DESCRIPTION OF THE INVENTION

Figure 1:
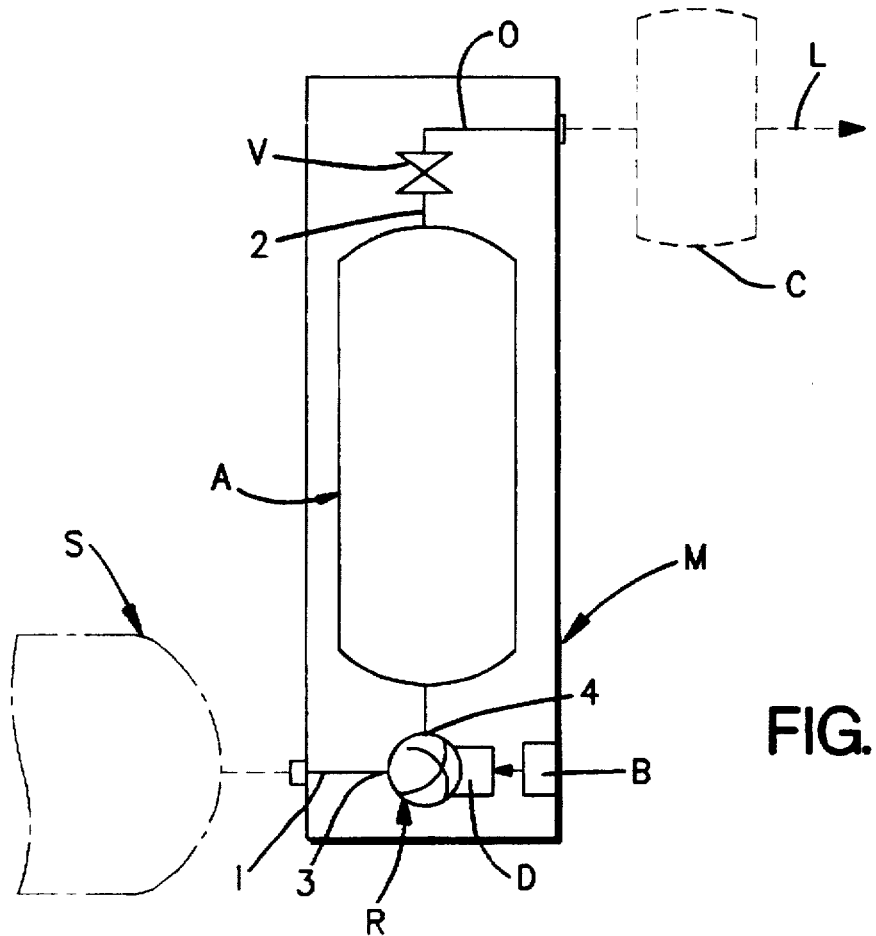
FIG. 1 is a schematic view of an embodiment of adsorption module according to the invention.

In the description which follows and in the drawings, identical or analogous elements have the same reference numerals, sometimes primed.

In FIG. 1, there is shown an adsorption module M according to the invention comprising typically an adsorber A, of typical vertical configuration, having an inlet 1 and an outlet 2 and containing at least one adsorbent capable of retaining at least one constituent of a gaseous mixture to be separated. The inlet 1 is connected to an inlet conduit I by a reversible rotary machine R, typically a Roots machine or a machine with multi-lobed rotors, driven by an electric motor D controlled by a control housing B. The outlet 2 is connected to an outlet conduit O adapted to be connected, via a shut-off valve $V_1$ and a storage C, to a utilization line L, whilst the inlet conduit I is adapted to be connected to a source S of gaseous mixture to be separated which can accept a rejection of residual gas by the device of the invention. According to one particular use of the invention, the gaseous mixture to be separated is air, the source S being the ambient atmosphere, the adsorber containing at least one adsorbent capable of retaining by adsorption the unwanted constituents of the constituent to be produced, which is typically oxygen or if desired nitrogen.

Preferably, as shown in FIG. 1, the outlet conduit O is connected, via a shut-off valve $V'_1$, to at least one reservoir R operatively connected solely to the outlet conduit O to take part in the balancing and repressurization phases of the adsorber A, as described above in connection with FIGS. 3A and 3B, or for the balancing and elution of this latter, by restoring at least a portion of the gas which has previously been stored.

There are shown on FIG. 2 the associated cycles of pressure (above) and of rotation of the rotary machine (below). The pressure cycle comprises a pressurization and production phase T0–T1, between the low pressure $P_m$ of the cycle, lower than atmospheric pressure Pa, typically between 0.2 and $0.6 \times 10^5$ Pa, preferably between 0.3 and $0.5 \times 10^5$ Pa, and the high pressure $P_M$ of the cycle, slightly greater than atmospheric pressure, typically between 1.05 and $1.5 \times 10^5$ Pa, and a depressurization and desorption phase T1–T2, between the pressures $P_M$ and $P_m$. The rotary machine is driven by the motor only during the central portions j and j' of the cycle phases. Thus, the blower being driven by the electric motor in compression step j, a short period of time before the reversal time $T_1$ between the two phases, the supply of the motor is interrupted, the rotary machine continuing its action, under the effect of kinetic energy, during step k until it naturally stops at time $T_1$ at which, this time under the influence of the pressure difference between the opposite gas passages 3 and 4, it triggers a natural rotation in the other direction, returned and amplified, at the end of step i', by active drive, in this reverse direction, of the rotary machine, operating then as a pump, during the duration of step j', the mechanical drive being likewise interrupted shortly before reaching the low pressure at instant $T_2$, the rotary equipment continuing its rotation during step k', until it stops and triggers at instant $T_2$, a rotation in the opposite direction, under the influence of the pressure differential between the passages 3 and 4 during step i, this rotation being accompanied and the amplified by mechanical drive during step j, as described above. Studies carried out by the applicant have shown that, with such a mode of operation, the duration of the auto-rotation decelerating phases k and k', of the order of one second, and the duration of the accelerating auto-rotation phases, of the order of 2 to 5 seconds, are perfectly compatible with the overall duration of most of the adsorption cycles (from 20 to 150 seconds according to the capacities and applications). On the other hand, one could use if needed the inertia of the rotary machine for the VSA cycles, for example, by means of inertial flywheels, as the case may be associated with unidirectional centrifugal clutches.

Figure 2:
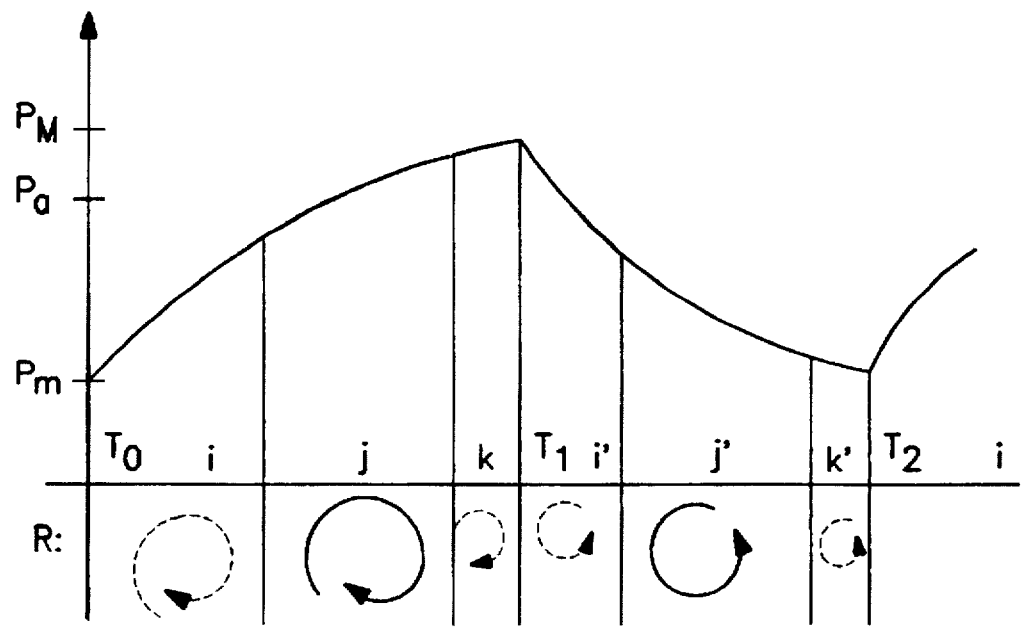
FIG. 2 is a schematic representation of a pressure cycle and corresponding rotation operations of the rotary machine.
Figure 3A:
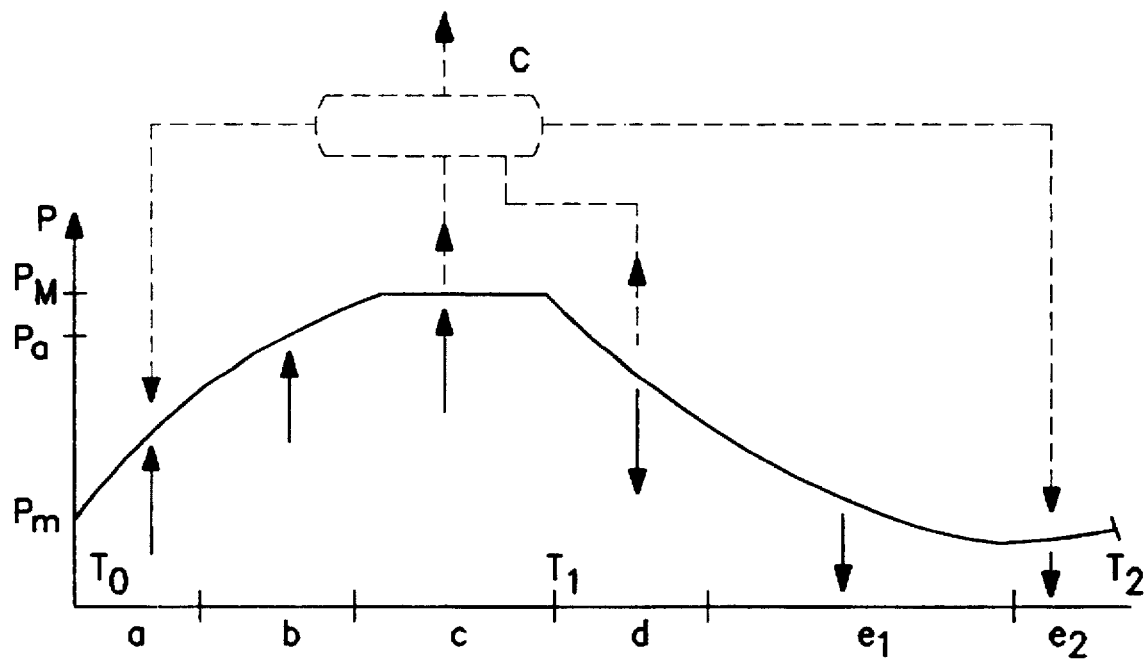
FIGS. 3A and 3B are graphs of a cycle of characteristic pressures and of the corresponding phases of actuation of the valves of a module according to FIG. 1.
Figure 3B:
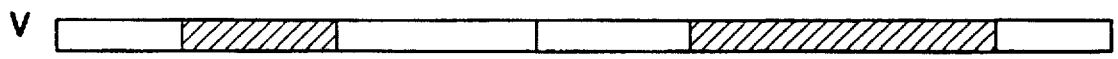

The pressure cycle of FIG. 2 is carried over to FIGS. 3A and 3B on which are indicated the gas circulation at the inlet and outlet of the adsorber and to and from the storage and the reservoir. The pressurization/production phase T0 to T1, during which the mixture to be separated is introduced by the rotary machine R into the inlet 1 of the adsorber A, is broken down into an initial step a in which the valve $V'_1$ is open and the gas or gaseous mixture non-preferentially adsorbed, or the production gas, for example oxygen, is introduced simultaneously in countercurrent, through the outlet of the adsorber A. This first pressurization step is followed by a second pressurization step b ensured by only the gaseous mixture to be separated, the valves $V_1$, $V'_1$ being closed. At the end of this second pressurization step b during which the pressure has exceeded atmospheric pressure, the valve $V_1$ is opened for a production step c at a pressure slightly exceeding or substantially isobaric with the high pressure of the cycle PM.

As explained above, at time T1, at the end of high pressure production of the cycle, the rotation of the rotary machine R reverses and the gaseous mixture rich in adsorbed components escapes by the inlet I during all the second phase T1–T2. In a first step d of this second phase, the valve $V'_1$ is open so as to ensure simultaneous depression from the top and from the bottom of the adsorber, after which, during a step $e_1$, the valves $V_1$ and $V'_1$ are closed and vacuum is drawn on the adsorber until the low pressure of the cycle $P_m$ continues to the end of phase $T_1$–$T_2$. Preferably, a little before the time $T_2$, the valve $V_1$ is opened to carry out a step $e_2$ of elution with production gas from the storage.

Because of its autonomy, a single adsorber device according to FIG. 1 imposes no particular constraints as to the respective duration of the phases T0–T1 and T1–T2, nor of the constituent steps of these phases. The motor D can drive the blower at the same speed in both directions of rotation or at different speeds. Preferably, the rotary machine R is driven at maximum speed during step j' of pumping phase $T_1$–$T_2$ and at a lesser speed, typically about 50% of the maximum speed, in the air compression phase, during step j of phase T0–T1.

As a modification, the supply to the motor can be interrupted at time $T_1$, or even after a short period of time after time $T_1$. In this case, the machine stops and naturally reverses during step d. Similarly, at the end of depressurization, the motor can be cut off at time $T_2$, or even a short period of time after time $T_2$. If the supply of the motor is carried out by means of a speed changer, this latter could be programmed to accompany and/or assist the stopping of the reversal of the direction of natural rotation of the machine.

There is shown in FIG. 4 a separation device using two modules $M_1$ and $M_2$ comprising adsorbers $A_1$ and $A_2$, and inlet conduits $I_1$ and $I_2$ as described above with respect to FIGS. 1, 2, 3A and 3B. In this case, the outlet conduits $O_1$ and $O_2$ are connected each by a valve $V_1$, $V_2$, respectively, to a same storage C in an upstream portion O of the production line L provided with a shut-off valve $V_P$ whose opening and closing steps are shown, beside those of valves $V_1$ and $V_2$, on the graphs of FIGS. 5A–5C on which have been superposed the pressure cycles of the two modules $M_1$ and $M_2$. In this embodiment with two modules, the inlet of gas countercurrent during the first step a of the pressurization/production phase is ensured by balancing or pseudo-balancing with the other adsorber beginning, in step d, its depressurization phase, the cycles of pressure and mechanical drive of the rotary machines $R_1$ and $R_2$ being moreover identical to those described above in relation to FIGS. 2, 3A and 3B.

In the devices with two modules, the duration of step a is, as has been seen, equal to the duration of step d and the duration of the phases T0–T1 and T1–T2 is the same in each module, the cycle of one adsorber being offset by one cycle phase relative to the other adsorber. As before, each rotary machine is driven at maximum speed during the pump step j' and at reduced speed, typically half the maximum speed, during the pressurization stage j.

As will be understood, a device for the separation of gas by adsorption according to the invention can comprise a plurality of modules M in parallel, with appropriate synchronization between the different modules. Thus, for a three-module device, if the same duration is sought for steps a and d, for each module, the duration of the pressurization/production phase T0–T1 is here equal to half the duration of the depressurization/desorption phase T1–T2, the modules having a time offset in their respective cycles of one-third of the total duration of the total cycle. For a high cycle pressure between 1.1 and $1.5 \times 10^5$ Pa and a low pressure cycle comprised between 0.5 and $0.3 \times 10^5$ Pa, a single speed of the drive motor in one and the other direction gives the best energy/capital cost to compromise.

For devices for the production of oxygen from air, with an adsorbent constituted by at least one zeolite, particularly a zeolite LiX, the pressures $P_M$ and $P_m$ are typically those mentioned in the preceding paragraph, the total duration of one cycle being comprised typically between 30 and 120 seconds.

The autonomy of the modules according to the invention permits assembling them in batteries of n modules and using them, as need be, automatically or manually, in whole or in part. Moreover, in case of accident or module maintenance, the operation can be easily ensured, at least temporarily, with n-1 modules.

Figure 6:
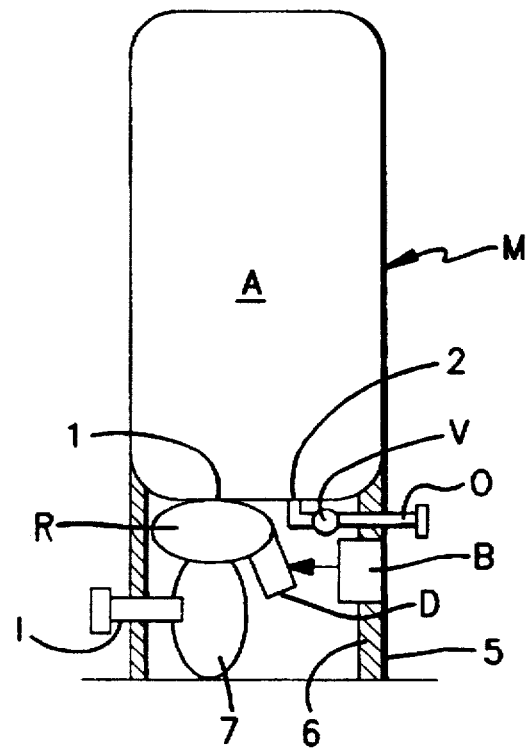
FIG. 6 is a schematic view of a practical embodiment of a module according to the invention.

There is shown in FIG. 6, a particular embodiment of a module according to the invention. As will be seen, the vertical adsorber A, typically with internal horizontal circulation of gas, has its outlet 2 likewise disposed in the lower portion, the adsorber A being supported by a frame 5 forming a skirt defining an internal volume in which are disposed the rotary machine R and its drive motor D, the frame 5 comprising a sound insulation coating 6. In FIG. 6, there is shown a regenerator 7 interposeable between the inlet conduit I and the rotary machine R and permitting, during the cold period, recovering a portion of the heat energy of the pump phase to reheat the gaseous mixture introduced into the adsorber in the compression stage. One could also insert a cooler, for example of the atmospheric type, between passage 4 of the rotary machine and inlet 1 of the adsorber.

What is claimed is:

1. A pressure swing adsorption process for producing a product gas separated from a gas mixture to be separated, making use of at least one paired assembly of a reversible rotary machine having a first port solely connected to a single source of said gas mixture and a second port connected to an adsorber having an outlet port connectable to a production line for supplying said product gas, in a cycle comprising the following successive steps:
   a) driving the rotary machine in a first direction during a first phase to establish fluid flow towards the second port to feed the adsorber with the gas mixture up to a high cycle pressure, higher than atmospheric pressure, and to supply product gas via said outlet port to the production line
   b) interrupting driving the machine in the first direction
   c) driving the machine in a second direction opposite to the first direction to establish a fluid flow towards the first port during a second phase to depressurize the adsorber to a low cycle pressure not exceeding $0.6 \times 10^5$ Pa
   d) interrupting driving the machine in the second direction, and resuming the cycle steps a) to d), wherein the gas mixture to be separated is atmospheric air.

2. Process according to claim 1, wherein the low cycle pressure is comprised between 0.3 and $0.5 \times 10^5$ Pa.

3. Process according to claim 1, wherein the mechanical drive of the rotary machine is interrupted for a predetermined period near the end of each said phase.

4. Process according to claim 1 wherein the speed of the rotary machine is different according to the phase.

5. Process according to claim 1, wherein during a first portion of the first phase, said product gas is simultaneously introduced into the adsorber through the outlet port of the adsorber.

6. Process according to claim 5, wherein during a first portion of the second phase, product gas escapes simultaneously from the outlet port of the adsorber.

7. Process according to claim 6, using at least two assemblies, wherein the first portions of the first and second phases have the same duration.

8. Process according to claim 1, using two assemblies, wherein for each assembly the first and the second phases have the same duration.

9. Process according to claim 1, using three assemblies, wherein for each assembly the duration of the second phase is twice that of the first phase.

10. Process according to claim 9, wherein the rotary machine is driven substantially at the same speed in each of the phases.

11. Process according to claim 1, wherein during the first phase the rotary machine is driven at a speed lower than its speed of rotation during the second phase.

12. An apparatus for the production of a product gas separated by selective adsorption from a feed gas mixture, comprising at least one unit including:
   a paired assembly of an adsorber and a powered reversible gas moving machine,
   the machine having a first port in permanent communication solely with a single source of gas containing said feed gas mixture, and a second port
   the adsorber having an inlet port in permanent communication with the second port of the machine and an outlet port selectively connectable, through valved conduit means, to at least one production line for conveying the product gas.

13. The apparatus of claim 12, wherein the valved conduit means include at least a first tank in permanent communication with the production line.

14. The apparatus of claim 13, further comprising at least a second tank having a single port connectable to the outlet port of the adsorber.

15. Device according to claim 12, which further comprises at least two paired assemblies disposed in parallel between said source and said utilization line.

16. The apparatus according to claim 15, wherein the inlet port and outlet port of the adsorber are located at the base of the latter.

17. The apparatus according to claim 12, wherein the adsorber is supported on a frame sheltering the machine and comprising sound insulation means.

18. The apparatus according to claim 12, wherein the machine is a Roots machine.

19. The apparatus according to claim 18, wherein the Roots machine is actuated by a variable speed electric motor.

20. An apparatus for supplying to a product line a gas separated by selective adsorption from a gas mixture in a source of atmospheric air, comprising:
   a first fluid flow line having a first end communicating in permanence solely with the source of atmospheric air and a second end connectable in permanent communication with the product line, the first line comprising, serially arranged from the first end to the second end, a reversible rotary machine, an adsorber, a first valve means and a first storage means having an outlet in fluid flow communication with the second end.

21. The apparatus of claim 20, comprising a second fluid flow line branched from the first line between the adsorber and the first valve means, and including a second valve means and a second storage means having a single fluid passage port.

* * * * *